(12) United States Patent
Rourk

(10) Patent No.: US 11,875,626 B2
(45) Date of Patent: *Jan. 16, 2024

(54) SYSTEMS, METHODS AND DEVICES FOR PROCESSING BATCHES OF COINS UTILIZING COIN IMAGING SENSOR ASSEMBLIES

(71) Applicant: Christopher J. Rourk, Dallas, TX (US)

(72) Inventor: Christopher J. Rourk, Dallas, TX (US)

(*) Notice: Subject to any disclaimer, the term of this patent is extended or adjusted under 35 U.S.C. 154(b) by 81 days.

This patent is subject to a terminal disclaimer.

(21) Appl. No.: 17/389,514

(22) Filed: Jul. 30, 2021

(65) Prior Publication Data

US 2021/0358254 A1  Nov. 18, 2021

Related U.S. Application Data

(63) Continuation of application No. 16/193,614, filed on Nov. 16, 2018, now Pat. No. 11,080,960, which is a continuation of application No. 15/180,867, filed on Jun. 13, 2016, now Pat. No. 10,134,214, which is a continuation of application No. 14/538,640, filed on Nov. 11, 2014, now Pat. No. 9,367,912.

(60) Provisional application No. 61/902,523, filed on Nov. 11, 2013.

(51) Int. Cl.
*G06K 9/00* (2022.01)
*G07D 5/10* (2006.01)
*G06T 7/00* (2017.01)

(52) U.S. Cl.
CPC .............. *G07D 5/10* (2013.01); *G06T 7/001* (2013.01); *G06T 2207/10061* (2013.01); *G06T 2207/10064* (2013.01); *G06T 2207/10116* (2013.01)

(58) Field of Classification Search
CPC ........ G07D 5/10; G06V 10/751; G06T 7/001; G06T 2207/10061; G06T 2207/10064; G06T 2207/10116
USPC ......................................... 382/136
See application file for complete search history.

(56) References Cited

U.S. PATENT DOCUMENTS

| | | | |
|---|---|---|---|
| 4,309,111 A | 1/1982 | Sobresky, Sr. | |
| 4,403,294 A | 9/1983 | Hamada et al. | |
| 4,899,392 A | 2/1990 | Merton | |
| 5,133,019 A | 7/1992 | Merton et al. | |

(Continued)

FOREIGN PATENT DOCUMENTS

| | | |
|---|---|---|
| WO | 2011/144931 | 11/2011 |
| WO | 2012/145842 | 11/2012 |

OTHER PUBLICATIONS

Goldsborough, "Counterfeit Coin Detection", Counterfeit Coins, https://wen/archive.org/wen/20120912233127/ http://coinsguide.reidgold.com/counterfeits.html, (2012), 22 pages.

(Continued)

*Primary Examiner* — Jonathan S Lee
(74) *Attorney, Agent, or Firm* — Jackson Walker LLP; Christopher J. Rourk

(57) ABSTRACT

A method for identifying counterfeit coins, comprising receiving surface image data and edge image data of the coin at a processor. Identifying a plurality of defects using the processor. Comparing each of the plurality of defects to a database of known authentic coin image data defects to determine whether the coin is authentic.

20 Claims, 1 Drawing Sheet

(56) References Cited

U.S. PATENT DOCUMENTS

| | | |
|---|---|---|
| 5,224,176 A | 6/1993 | Crain |
| 6,634,482 B1 | 10/2003 | Miele |
| 7,995,196 B1 | 8/2011 | Fraser |
| 2004/0003981 A1 | 1/2004 | Lee |
| 2009/0284754 A1 | 11/2009 | Haddock |
| 2009/0295912 A1 | 12/2009 | Haddock |
| 2009/0296365 A1* | 12/2009 | Haddock ............... G07D 5/005 362/4 |
| 2009/0303478 A1 | 12/2009 | Haddock |
| 2012/0288182 A1 | 11/2012 | Lee et al. |
| 2012/0301009 A1* | 11/2012 | Dabic .................... G07D 3/14 382/136 |
| 2013/0068586 A1* | 3/2013 | Jonsson ................. G07D 5/08 194/317 |
| 2013/0178139 A1* | 7/2013 | Hallowell .............. G07D 11/50 453/15 |
| 2013/0315437 A1 | 11/2013 | Kerschner et al. |
| 2014/0355864 A1 | 12/2014 | Truong et al. |
| 2015/0117701 A1* | 4/2015 | Ross .................... G06V 10/225 382/100 |

OTHER PUBLICATIONS

Van Zeghbroeck, "Principles of Semiconductor Devices", http://ecee/colorado.edu/~bart/book/chapter4/ch4_6htm#4_6_5, (2011), 7 pages.

Sandu, et al., "Authentication of Old Bronze Coins I—Study on Archaeological Patina", Acta Universitatis Cibiniensis Seria F Chemia 9. (2006-I): pp. 39-53.

\* cited by examiner

SYSTEMS, METHODS AND DEVICES FOR PROCESSING BATCHES OF COINS UTILIZING COIN IMAGING SENSOR ASSEMBLIES

RELATED APPLICATIONS

The present application is a continuation of U.S. patent application Ser. No. 16/193,614, filed Nov. 16, 2018, which is a continuation of U.S. patent application Ser. No. 15/180,867, filed Jun. 13, 2016, now issued on Nov. 20, 2018 as U.S. Pat. No. 10,134,214, which is a continuation of U.S. patent application Ser. No. 14/538,640, filed Nov. 11, 2014, now issued on Jun. 14, 2016 as U.S. Pat. No. 9,367,912, which claims priority to and benefit of U.S. Provisional Patent Application No. 61/902,523, filed Nov. 11, 2013, which is hereby incorporated by reference for all purposes as if set forth herein in its entirety.

TECHNICAL FIELD

The present disclosure relates to coin grading, and more specifically to an automated coin grading system and method that facilitates the grading of ancient coinage.

BACKGROUND OF THE INVENTION

Coin grading is typically based on a number of factors that can be determined from the appearance of the coin, but additional tests are typically not a component of coin grading due to the cost of such tests.

SUMMARY OF THE INVENTION

A method for identifying counterfeit coins is provided that includes receiving surface image data and edge image data of the coin at a processor. A plurality of defects are identified using the processor. Each of the plurality of defects is compared to a database of known authentic coin image data defects to determine whether the coin is authentic.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
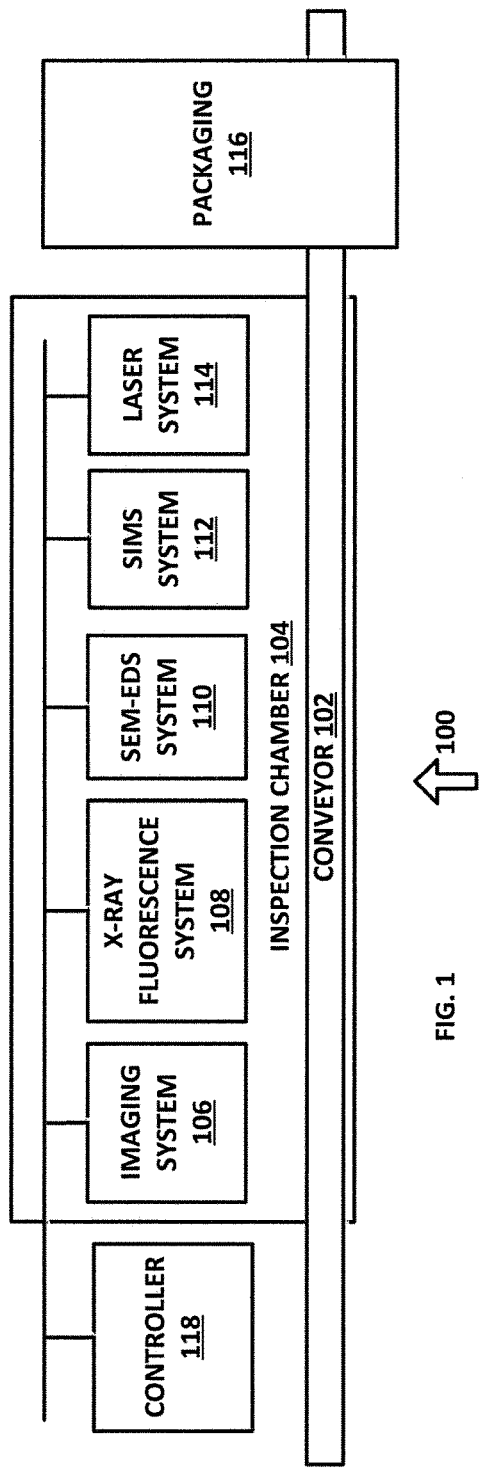
FIG. 1 is a diagram of a system for automated coin grading in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for automated coin grading in accordance with an exemplary embodiment of the present disclosure. System 100 allows coins to be automatically graded using non-destructive testing equipment.

System 100 includes conveyor 102, which is used to move coins through an inspection chamber 104. Conveyor 102 can be a belt type conveyor as shown, or other suitable conveyor systems, such as tubes, trays or other suitable systems that are used to process a large number of small devices for inspection, such as semiconductor dies, packaged chips or other suitable devices. Inspection chamber 104 can be an open air inspection chamber, a vacuum inspection chamber, an inert gas inspection chamber or other suitable inspection chambers.

System 100 includes imaging system 106, x-ray fluorescence system 108, scanning electron microscope with energy dispersive x-ray spectrometry (SEM-EDS) system 110, Secondary ion mass spectrometry (SIMS) system 112, laser inspection system 114 and other suitable inspection systems, such as those that are used in the semiconductor manufacturing and packaging industry, such as a Superconducting Quantum Interference Device (SQUID) microscope, free electron laser inspection, x-ray laser inspection or other suitable inspection processes.

Imaging system 106 generates digital image data of both surfaces and the edge of a coin and analyzes the image data to generate profile data. In one exemplary embodiment, imaging system 106 can compare the coin image data to a database of coin image data and can determine whether the coin image matches known authentic coin images, known counterfeit coin images or other suitable image data. Imaging system 106 can operate in white light, discrete optical wavelengths, infrared or ultraviolet wavelengths, or in other suitable manners, and can generate grading data that includes a score indicating a percentage identical to a single known authentic coin image, a percentage identical to a composite of known authentic coin images, a percentage identical to a single known counterfeit coin image, a percentage identical to a composite of known counterfeit coin images, or other suitable data. In one exemplary embodiment, composites of known authentic and known counterfeit coin images can be assembled and used to generate a grade that indicates the relative likelihood that a coin is counterfeit or authentic. In another exemplary embodiment, an exact match to a single counterfeit or authentic coin image can be used to generate a second grade. Likewise, similar processes can be used on edge image data, image data for predetermined coin features (such as relative distances between two or more coin features), or other suitable coin image data.

In this exemplary embodiment, a coin can have a number of surface defects, structural defects, formation anomalies and other features that uniquely identify the coin. When a counterfeit coin is made, the counterfeiter may use an authentic coin to create multiple counterfeit copies, such that these features will be identical for each of those copies. In addition, the counterfeiter may use chemical or mechanical damage to try to simulate aging of the coin. However, such copying and simulated aging techniques can be detected using image data analysis. For example, when an ancient coin was struck, it was typically struck from a die using a coin blank "tree," and then broken off the tree in a manner that creates a unique edge defect. Likewise, each die may have included defects, such that coins struck from that die would contain the same defect. Double strikes, weak strikes, worn dies, overstrikes, lamination and other such defects can also be detected using image data analysis. Such defects would be subject to aging from oxidation and other environmental factors at the same rate as the other surfaces of the coin, whereas a counterfeit coin that copies an ancient coin would copy the aged defect, and then expose it to subsequent simulated aging techniques. As such, the fact that a defect is present in the same location as other coins from that mint but varies from the defects in other known authentic coins will indicate that the coin is a counterfeit from image data inspection. Such defects can be identified in image data as a function of a number of pixels that define an area under a predetermined level, type and direction of lighting (e.g. white light, monochromatic light, lighting angle), where each pixel has an associated brightness value. The size and shape of each defect (length, width, shape), the brightness values of each pixel of the shape and other image data can be used to compare with statistical sets of image data for known authentic and counterfeit coins. For example, known authentic coins may have a size, shape, histogram pixel distribution and other image data characteristics for a number of surface and edge defects that are consistent between coins (such as where the entire population of coins have 100 different measured defects, and each coin has at least 30 of each of those measured defects). Likewise, known counterfeit coins may have 100 different measured defects that are missing in each of the known authentic coins, where any single one of those known counterfeit defects can potentially identify a counterfeit coin.

The shape of a defect can also be used to determine whether the defect is authentic or counterfeit. For example, a crack in patina for an authentic coin can have a length to width ratio that is different from the length to width ratio of a crack caused by accelerated aging. The variation in width of an authentic crack can likewise be different from the variation in width for a counterfeit coin. Pitting can likewise have differences between authentic and counterfeit coins, such as shape, perimeter, depth, size and other features. The depth of cracks, pitting and other defects can be detected based on histograms of pixel brightness values, where a deeper crack or pit will have more associated pixel values that are darker. The distribution of different types of defects can also be indicative of authentic or counterfeit coins, such as a total number of types of defects (cracks, pits, mechanical), a distance between different types of defects, a statistical grouping of types of defects, or other suitable data.

Likewise, certain types of aging and environmental damage cannot be simulated by accelerated aging techniques. The development of an oxidation coating (patina), crystallization, pitting, cracks, porosity, silver horns and other aging over centuries will result in a surface texture that is different from accelerated aging and oxidation and can be detected using image data analysis. Using modern image data analysis techniques with resolution capability in the micron range, the variations in such surface damage features under different types of lighting can result in statistically detectable variations that can distinguish counterfeit coins from authentic coins. For example, a crack in a coin that aged in a dry soil environment and which was stored in a clay container might have different size parameters (length, width, width variation, length to width ratios, perimeter shapes) than a coin that was found in salt water, such that if the type of defect does not match the type of location from which the coin was reported to be found, then that discrepancy could be an indication of a forgery.

Likewise, the type of aging can vary based on where coins were found. Ancient coins can be found in a number of different locations, such as buried on dry land, buried on wet land, submerged in fresh water, submerged in salt water, sealed in clay, sealed in pitch, or in a number of other manners that have an impact on the type of surface damage that would be expected. The origin data for a coin can also be used to determine whether the coin is authentic or counterfeit using such data. For example, a counterfeit coin might have a country of origin but no further detail, while an authentic coin might have a specific location and date of excavation that can be used not only to authenticate the coin but to generate additional data for testing other coins. If the country of origin is not close to the mint where the coin was made, that could also be an indication of a counterfeit coin.

Changes in coin features over time can also be used to distinguish authentic from counterfeit coins. For example, a modern forgery may be made from materials that age differently from authentic coins, or the processes used to accelerate aging can include exposure to chemicals that continue to age the coin at an accelerated rate when compared to a naturally-aged coin. By recording image data of the coin over time and analyzing changes in the image data, it may also be possible to detect a counterfeit coin.

In summary, factors that can be identified and stored for each coin based on image data of the coin that can be used to determine whether the coin is authentic or counterfeit include:

Presence or absence of mint defects (double strikes, weak strikes, worn dies, overstrikes, lamination) on face or edge.

Presence or absence of oxidation, alone or as a function of location where coin was found and type of material that coin was stored in.

Presence or absence of pitting, porosity or cracking in oxidation layer, alone or as a function of location where coin was found and type of material that coin was stored in.

Presence or absence of crystallization, alone or as a function of location where coin was found and type of material that coin was stored in, Presence or absence of mechanical damage to coin surface or edge as a function of location where the coin was found and type of material that coin was stored in.

Differences between characteristics of mint defects, oxidation, pitting, cracking and mechanical damage relative to known authentic coins.

Changes in coins over time relative to changes in known authentic coins.

Pixel histograms of defects.

Length to width ratios of defects.

Absolute length, width or depth values of defects.

Perimeter shapes of defects.

These factors can also be detected using other non-destructive diagnostic techniques, as discussed in greater detail herein.

X-ray fluorescence system 108 uses energy dispersive x-ray fluorescence to inspect the sides and edges of a coin and generate digital X-ray fluorescence data for the coin. X-ray fluorescence system 108 can compare the coin X-ray fluorescence data to a database of coin X-ray fluorescence data and can determine whether the coin X-ray fluorescence matches known authentic coin X-ray fluorescence data, known counterfeit coin X-ray fluorescence data or other suitable X-ray fluorescence data. X-ray fluorescence system 108 can operate in variable X-ray energy spectrums or in other suitable manners, and can generate grading data that includes a score indicating a percentage identical to a single known authentic coin X-ray fluorescence data, a percentage identical to a composite of known authentic coin X-ray fluorescence data, a percentage identical to a single known counterfeit coin X-ray fluorescence data, a percentage identical to a composite of known counterfeit coin X-ray fluorescence data, or other suitable data. In one exemplary embodiment, composites of known authentic and known counterfeit coin X-ray fluorescence data can be assembled and used to generate a grade that indicates the relative likelihood that a coin is counterfeit or authentic. In another exemplary embodiment, an exact match to a single counterfeit or authentic coin X-ray fluorescence data set can be used to generate a second grade. Likewise, similar processes can be used on edge X-ray fluorescence data, X-ray fluorescence data for predetermined coin features (such as relative distances between two or more coin features), or other suitable coin X-ray fluorescence data.

SEM-EDS system 110 uses scanning electron microscopy with energy dispersive x-ray spectrometry to inspect the sides and edges of a coin and generate digital X-ray spectrometry data for the coin. SEM-EDS system 110 can compare the coin X-ray spectrometry data to a database of coin X-ray spectrometry data and can determine whether the coin X-ray spectrometry matches known authentic coin X-ray spectrometry data, known counterfeit coin X-ray spectrometry data or other suitable X-ray spectrometry data. SEM-EDS system 110 can operate in variable X-ray energy spectrums or in other suitable manners, and can generate grading data that includes a score indicating a percentage identical to a single known authentic coin X-ray spectrometry data, a percentage identical to a composite of known authentic coin X-ray spectrometry data, a percentage identical to a single known counterfeit coin X-ray spectrometry data, a percentage identical to a composite of known counterfeit coin X-ray spectrometry data, or other suitable data. In one exemplary embodiment, composites of known authentic and known counterfeit coin X-ray spectrometry data can be assembled and used to generate a grade that indicates the relative likelihood that a coin is counterfeit or authentic. In another exemplary embodiment, an exact match to a single counterfeit or authentic coin X-ray spectrometry data set can be used to generate a second grade. Likewise, similar processes can be used on edge X-ray spectrometry data, X-ray spectrometry data for predetermined coin features (such as relative distances between two or more coin features or the other processes described herein for use with image data), or other suitable coin X-ray spectrometry data.

SIMS system 112 uses secondary ion mass spectrometry to inspect the sides and edges of a coin and generate digital secondary ion mass spectrometry data for the coin. SIMS system 112 can compare the coin secondary ion mass spectrometry data to a database of coin secondary ion mass spectrometry data and can determine whether the coin secondary ion mass spectrometry data matches known authentic coin secondary ion mass spectrometry data, known counterfeit coin secondary ion mass spectrometry data or other suitable secondary ion mass spectrometry data. SIMS system 112 can operate in suitable ion masses or in other suitable manners, and can generate grading data that includes a score indicating a percentage identical to a single known authentic coin secondary ion mass spectrometry data, a percentage identical to a composite of known authentic coin secondary ion mass spectrometry data, a percentage identical to a single known counterfeit coin secondary ion mass spectrometry data, a percentage identical to a composite of known counterfeit coin secondary ion mass spectrometry data, or other suitable data. In one exemplary embodiment, composites of known authentic and known counterfeit coin secondary ion mass spectrometry data can be assembled and used to generate a grade that indicates the relative likelihood that a coin is counterfeit or authentic. In another exemplary embodiment, an exact match to a single counterfeit or authentic coin secondary ion mass spectrometry data set can be used to generate a second grade. Likewise, similar processes can be used on edge secondary ion mass spectrometry data, secondary ion mass spectrometry data for predetermined coin features (such as relative distances between two or more coin features or the other processes described herein for use with image data), or other suitable coin secondary ion mass spectrometry data.

Laser inspection system 114 uses laser energy in a suitable wavelength (visible, ultraviolet, infrared, x-ray, electron or other suitable energy) to inspect the sides and edges of a coin and generate digital laser data for the coin. Laser inspection system 114 can compare the coin laser data to a database of coin laser data and can determine whether the coin laser data matches known authentic coin laser data, known counterfeit coin laser data or other suitable laser data. Laser inspection system 114 can operate in suitable energy wavelengths or in other suitable manners, and can generate grading data that includes a score indicating a percentage identical to a single known authentic coin laser data, a percentage identical to a composite of known authentic coin laser data, a percentage identical to a single known counterfeit coin laser data, a percentage identical to a composite of known counterfeit coin laser data, or other suitable data. In one exemplary embodiment, composites of known authentic and known counterfeit coin laser data can be assembled and used to generate a grade that indicates the relative likelihood that a coin is counterfeit or authentic. In another exemplary embodiment, an exact match to a single counterfeit or authentic coin laser data set can be used to generate a second grade. Likewise, similar processes can be used on edge laser data, laser data for predetermined coin features (such as relative distances between two or more coin features or the other processes described herein for use with image data), or other suitable coin laser data.

Controller 114 coordinates the operation of the components of system 100, and generates and stores the profile and scoring data. In one exemplary embodiment, controller 114 can be distributed within each of the various system components, can include external functionality or can function in other suitable manners. Controller 114 can also be used to generate a unique identifier for each coin, either based on the profile, based on a sequential numbering system, based on the source of the coin, or based on other suitable data.

Packaging system 116 performs packing of coins, such as by encasing the coin in a sealed plastic package, storing coin profile data on a semiconductor chip attached to the package, by associating packaging data with the coin profile data or in other suitable manners.

In operation, system 100 coordinates and automates the inspection and grading of coins, such as ancient coins that have significantly more variability than modern minted coins. System 100 allows detailed coin profiles to be generated using inspection equipment similar to inspection equipment used in the semiconductor industry, and can thus generate low cost grading data that provides a detailed, reproducible and highly reliable grading profile. In addition, system 100 can be used to re-inspect a graded coin, such as to determine whether the coin grade matches the re-inspected coin grade, to determine whether coin profile data for the coin has previously been stored (if the identification number for the coin has been lost), or for other suitable purposes.

Figure 2:
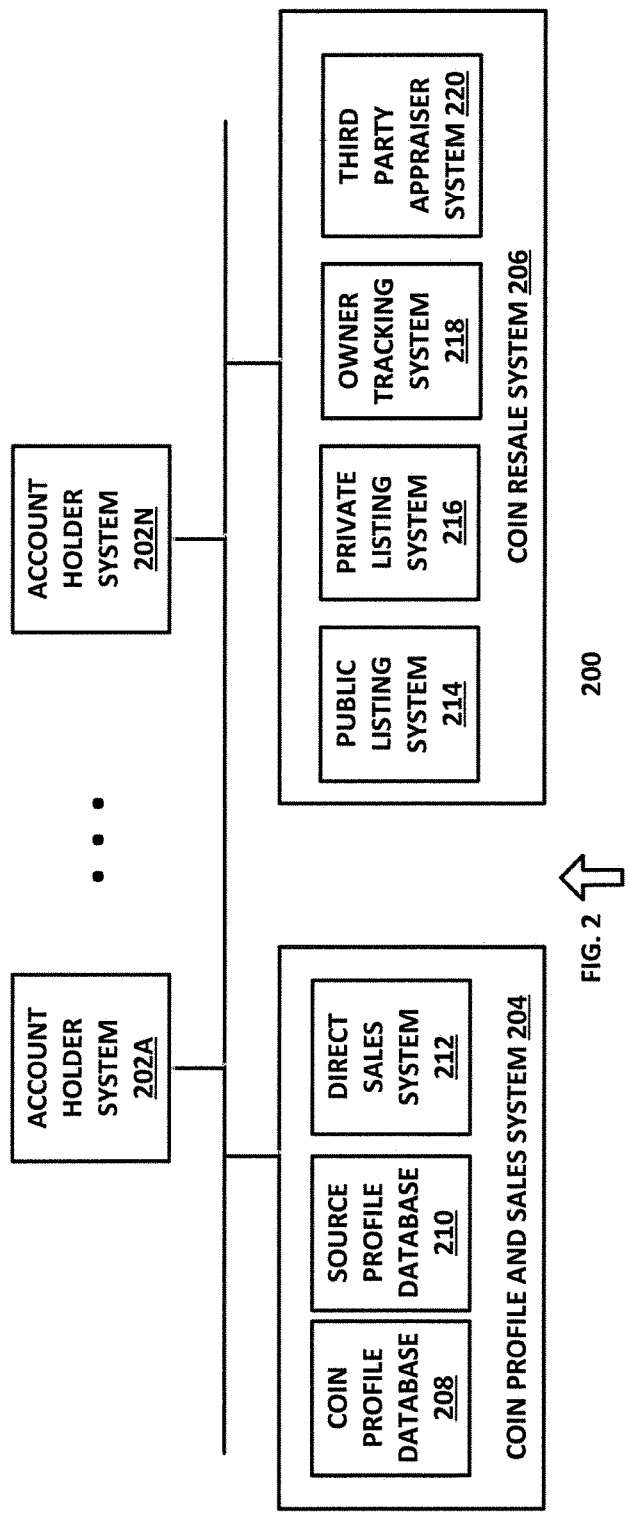
FIG. 2 is a diagram of a system for generating a database of coin grading and status data in accordance with an exemplary embodiment of the present disclosure.

FIG. 2 is a diagram of a system 200 for generating a database of coin grading and status data in accordance with an exemplary embodiment of the present disclosure. System 200 can be implemented in hardware or a suitable combination of hardware and software, and can be one or more software systems operating on a general purpose processor.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as keyboards or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

System 200 includes account holder systems 202A through 202N, which can be implemented as a web interface accessible through a browser, as a smart phone application or in other suitable manners. Account holder systems 202A through 202N allow uses to access coin profile and sales system 204, coin resale system 206 and their associated systems.

Coin profile and sales system 204 includes coin profile database 208, source profile database 210 and direct sales system 212. Coin profile database 208 stores profile data for each coin that has been processed using system 100, such as to track the original profile data, subsequent profile data or other suitable data. Coin profile database 208 can be used to generate profile data for grading coins, as discussed above.

Source profile database 210 stores profile data for sources of coins, including known counterfeits associated with a source, known authentic coins associated with a source, source elemental data for sources that are located in a known location (such as an excavation location), buyer and seller information, and other suitable data. Source profile database 210 can receive fraudulent coin data and can identify other coins that may have come from the same source, the same geographical location, the same buyer or seller, or other suitable data.

Direct sales system 212 allows users at user systems 202A through 202N to purchase graded coins that have not previously been sold. In one exemplary embodiment, direct sales system 212 allows users to set up a user account, to store coin profile data for purchased coins in the users profile for insurance or other purposes, to purchase insurance for graded coins that have been purchased, to submit coins for grading and to provide source data for such coins, and to perform other suitable functions.

Coin resale system 206 includes public listing system 214, private listing system 216, owner tracking system 218 and third party appraiser system 220. Public listing system 214 allows a user to generate one or more public listings of a coin, such as a coin for sale, a coin for display or other suitable public listings. A user can access the public listing and obtain additional data that has also been made public, such as sales history, grading data (image, x-ray fluorescence, x-ray spectrometry, secondary ion mass spectrometry, laser or other suitable grading data), place a bid on the coin, arrange for the purchase or additional inspection of a coin, or perform other suitable functions.

Private listing system 216 allows a user to generate one or more private listings of a coin, such as a coin for sale to one or more predetermined users, a coin for display to one or more predetermined users or other suitable private listings. A user can access the private listing after being authenticated and obtain additional data that has also been made available, such as sales history, grading data (image, x-ray fluorescence, x-ray spectrometry, secondary ion mass spectrometry, laser or other suitable grading data), place a bid on the coin, arrange for the purchase or additional inspection of a coin, or perform other suitable functions.

Owner tracking system 218 allows a user to track the ownership history of a coin, such as to determine the source of a coin, whether the coin was ever held by a third party, or other suitable data. Owner tracking system 218 thus allows a user to perform independent research into the authenticity of a coin.

Third party appraiser system 220 allows a user to obtain a third party appraisal of a coin and to have that information associated with the public record for the coin. In one exemplary embodiment, a buyer might obtain a coin and determine through a third party appraiser that the coin is not authentic. Third party appraiser system 220 allows such information to be publicly disclosed, so as to allow others to investigate the seller, to allow a comparison to be made with the original coin grading profile, or for other suitable purposes.

In operation, system 200 facilitates the processing and trading of graded coins, but allowing grading data for the coin to be stored, ownership data to be tracked and to allow third parties to identify potential counterfeiters.

In one exemplary embodiment, a controller can be programmed to automatically inspect and characterize coins for storage in a database, to allow the coins to be analyzed for authenticity and tracked over time. The algorithm can include one or more software instructions that control the controller to receive surface image data and edge image data of the coin, such as by aligning a coin with an image data system such as a high resolution camera, by adjusting an illumination level and by then activating the camera to generate a set of image data, such as an array of pixels having one or more color components and an associated intensity value. The instructions can control the processor to identify a plurality of defects, as well as identifying features of the coin such as a size of the coin, images on the coin, wording on the coin and other features.

The instructions can further control the processor to compare each of the plurality of defects to a database of known authentic coin image data defects to determine whether the coin is authentic. The instructions can further control the processor to compare each of the plurality of defects to a database of known counterfeit coin image data defects to determine whether the coin is counterfeit. The instructions can further control the processor to identify a set of pixels of image data associated with a defect that have a predetermined length and width. The instructions can further control the processor to identify a set of pixels of image data associated with a defect that have a predetermined histogram. The instructions can further control the processor to identify a set of pixels of image data associated with a defect that have a predetermined shape. The instructions can further control the processor to identify a set of pixels of image data associated with a defect that have a predetermined length to width ratio. The instructions can further control the processor to identify a set of pixels of image data associated with a defect that have a predetermined width variation. The instructions can further control the processor to identify a number of defects in the image data that are also present on known authentic coins. The instructions can further control the processor to determine from the image data whether the number of defects is present on the coin. The instructions can further control the processor to identify a number of defects in the image data that are present on known counterfeit coins. The instructions can further control the processor to determine from the image data whether a single one of the number of defects is present on the coin. The instructions can further control the processor to store the surface image data and the edge image data associated with identifying information for the coin, such as a unique identifier, an owner name, a date of the coin, mint information for the coin, a location where the coin was found and other suitable data. The instructions can further control the processor to receive surface image data and edge image data of the coin at a processor at a second time, to identify a plurality of defects using the processor at the second time, and to compare each of the plurality of defects at the second time to defects from the stored surface image data and the stored edge image data to determine whether a difference exists. The instructions can further control the processor to receive x-ray fluorescence data of the coin at a processor, to identify a plurality of defects in the x-ray fluorescence data using the processor, and to compare each of the plurality of defects in the x-ray fluorescence data to a database of known authentic coin x-ray fluorescence data defects to determine whether the coin is authentic. The instructions can further control the processor to receive scanning electron microscope data of the coin at a processor, to identify a plurality of defects in the electron microscope data using the processor, and to compare each of the plurality of defects in the electron microscope data to a database of known authentic coin electron microscope data defects to determine whether the coin is authentic. The instructions can further control the processor to receive secondary ion mass spectrometry data of the coin at a processor, to identify a plurality of defects in the secondary ion mass spectrometry data using the processor, and to compare each of the plurality of defects in the secondary ion mass spectrometry data to a database of known authentic coin secondary ion mass spectrometry data defects to determine whether the coin is authentic. The instructions can further control the processor to receive laser image data of the coin at a processor, to identify a plurality of defects in the laser image data using the processor and to compare each of the plurality of defects in the laser image data to a database of known authentic coin laser image data defects to determine whether the coin is authentic.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for inspecting coins, comprising:
receiving a plurality of coins at a processing system having an inspection chamber and a mechanical transport;
processing each coin using an optical sensor assembly mounted at least partially within the inspection chamber adjacent the mechanical transport, the optical sensor assembly being configured to analyze coins moving on the mechanical transport and to generate image signals indicative of coin image information for processing the coins, the optical sensor assembly including one or more light emitting devices and a control device communicatively coupled to and operable for controlling the one or more light emitting devices; and
packaging each coin using a packaging system coupled to the mechanical transport and configured to receive the processed coins and to package one or more coins wherein the coin image information comprises a set of pixels of image data associated with a location where the coin was acquired.

2. The method of claim 1 wherein the coin image information comprises image data items caused by non-environmental damage.

3. The method of claim 1 wherein the coin image information comprises a set of pixels of image data containing coin edge data.

4. The method of claim 1 wherein the coin image information comprises a set of pixels of image data having a predetermined length and width.

5. The method of claim 1 wherein the coin image information comprises image data having a predetermined color variation histogram.

6. The method of claim 1 wherein the coin image information comprises a set of pixels of image data having a predetermined shape.

7. The method of claim 1 wherein the coin image information comprises a set of pixels of image data having a predetermined length to width ratio.

8. The method of claim 1 wherein the coin image information comprises a set of pixels of image data having statistical variations in defect height parameters.

9. The method of claim 1 wherein the coin image information comprises a set of pixels of image data of damage that is present on a known authentic coin.

10. The method of claim 1 wherein the coin image information comprises image data items caused by fabricated damage.

11. The method of claim 1 wherein the coin image information comprises a set of pixels of image data associated with a location.

12. The method of claim 1 wherein the coin image information comprises counterfeit coin image information.

13. The method of claim 1 where packaging each coin using a packaging system comprises dispensing a plurality of coins into a container.

14. A method for inspecting coins, comprising:
receiving a plurality of coins at a processing system having an inspection chamber and a mechanical transport;
processing each coin using an optical sensor assembly mounted at least partially within the inspection chamber adjacent the mechanical transport, the optical sensor assembly being configured to analyze coins moving on the mechanical transport and to generate image signals indicative of coin image information for processing the coins, the optical sensor assembly including one or more light emitting devices having a controllable wavelength and a control device communicatively coupled to and operable for controlling the one or more light emitting devices; and
packaging the coins using a packaging system coupled to the mechanical transport and configured to receive the processed coins and to package one or more coins wherein the coin image information comprises a set of pixels of image data associated with a location where the coin was acquired.

15. The method of claim 14 wherein the packaging system is configured to package the one or more coins as a function of predetermined data.

16. The method of claim 14 wherein the plurality of sets of image information comprises a plurality of sets of image information of known counterfeit coins having non-environmental damage.

17. A processor configured to perform a method for inspecting coins, the method comprising:
receiving a plurality of sets of coin data, wherein each set of coin data includes a plurality of image data items and associated source data that identifies a location associated with a location of the set of coin data;
generating a data structure that associates each of the sets of coin data with other sets of image data as a function of the image data items and the associated source data;
receiving image data of a coin at the processor that includes a plurality of image data items; and
processing the image data of the coin at the processor with the data structure to determine whether the image data of the coin is associated with image data items that have associated source data that identifies the location wherein the image data of the coin comprises a set of pixels of image data associated with a location where the coin was acquired.

18. The processor of claim 17 further comprising dispensing a plurality of coins in a single container.

19. The processor of claim 17 wherein one or more of the image data items comprise a set of pixels of image data.

20. The processor of claim 17 wherein each of the image data items comprise a set of pixels of image data having a predetermined length and width.

* * * * *